3,535,152
HEAT CURED PRESSURE-SENSITIVE ADHESIVE TAPE
Ralf Korpman, East Brunswick, N.J., assignor to Johnson & Johnson, a corporation of New Jersey
No Drawing. Filed Dec. 27, 1966, Ser. No. 604,535
Int. Cl. C09j 7/04
U.S. Cl. 117—122                                6 Claims

ABSTRACT OF THE DISCLOSURE

This application discloses pressure-sensitive adhesive compositions, tapes and sheets wherein the adhesive formulation comprises an aldehyde-resin-reactive diene elastomer, a tackifier compatible with said elastomer, and the combination of an oil soluble heat and elastomer-reactive bromomethyl alkylated phenol formaldehyde curing resin and a zinc resinate accelerator therefor.

---

The present invention relates to pressure-sensitive adhesive compositions and tapes, and more particularly, to normally tacky and pressure-sensitive adhesive compositions which are adapted to be heat cured in situ after application to a tape backing; and to the resulting pressure-sensitive adhesive tapes.

Pressure-sensitive adhesive compositions of this type normally comprise an elastomer, or elastomeric constituent, which provides adhesive strength and elasticity; a tackifier to contribute the desired tackiness or quick stick, i.e., the ability to stick quickly or grab onto an application surface; and a curing agent to reduce the thermoplasticity of the adhesive composition after it is applied to a sheet or tape backing. Various other materials such as accelerators for the heat cure, stabilizers, antioxidants, fillers and the like may be included to adapt the adhesive for a particular application. In this type of composition, the properties of a given formulation cannot be attributed to any one of the constituents acting alone, but rather to the chemical and physical cooperation of the different components of the resulting adhesive system.

A major controlling factor in the cost of producing cured pressure-sensitive adhesive tapes and sheets from adhesive compositions of this type is the time required to cure the adhesive in situ after it has been coated on one side of the tape backing. Since the size and operating conditions of the ovens and/or other curing facilities utilized in conjunction with adhesive tape manufacturing lines normally are fixed, the curing time limits the speed of the line. Typically, a single drying and curing oven will be provided somewhere in the production line and the speed of the line will be limited by the length of the curing zone of the oven and its maximum average temperature.

Heretofore, no single curing system has been available which will economically cure all or even a large percentage of the various adhesive formulations which are used in an adhesive tape plant producing a full line of products. Thus, it has been necessary to develop different curing systems for different adhesive compositions in an attempt to obtain optimum results in each case. This normally involves different combinations of curing resins and accelerators. Typically, stability and other properties have been sacrificed when adhesive compositions of this type have been formulated to give faster cures. Another very important factor is curing temperature. For instance, curing speed may be increased tenfold, in some cases, by increasing the curing temperature from 250° F. to 350° F. at the same level of cure. Thus, one of the major difficulties has been in curing pressure-sensitive adhesive tapes and sheets based on heat sensitive backing materials such as cellulose acetate. Tapes of this type normally are cured at temperatures in the neighborhood of 250° F. and require strong acid accelerators which may not always provide optimum properties in the resulting tapes.

I have discovered a novel combination of curing resin and accelerator which gives faster curing rates with the diene elastomers normally used in pressure-sensitive adhesives over the full range of curing temperatures normally found in commercial production. The curing combination of my invention is a bromo-methyl alkylated phenol formaldehyde curing resin with a zinc resinate accelerator within certain limited proportions in the adhesive composition. In addition to the much faster curing which this provides, my adhesives and adhesive tapes possess superior tack as well as superior compatibility with diene elastomers, thereby assuring superior stability and high and low temperature adhesive properties. Another very important advantage of the fast curing adhesives of my invention is that they may be used to produce pressure-sensitive adhesive tapes and sheets on backings of heat sensitive materials, such as cellulose acetate, without the necessity for adding strong acids to act as accelerators.

The adhesive composition of my invention comprises an aldehyde-resin-reactive diene elastomer, about 20–500 parts of a tackifier compatible with said elastomer, about 5–40 parts of an oil soluble heat and elastomer-reactive bromo-methyl alkylated phenol formaldehyde curing resin, and about 5–25 parts of a zinc resinate accelerator. About 10–30 parts of the curing resin are preferred, and for maximum curing speed, about 10–20 parts of zinc resinate are preferred. All parts given above and used hereinafter in this application are per one hundred parts of the elastomer, unless otherwise indicated. The curing resin normally comprises about 1–9 percent by weight of bromine, and the resin normally is present in the composition in an amount equal to or greater than that of the zinc resinate accelerator. Preferably, the curing resin of this invention is a para alkyl phenol formaldehyde resin bromomethylated in one or both of the ortho positions. Preferably, also, the para alkyl group contains about 4–20 carbon atoms and most preferably, 8 or 9 carbon atoms. United States Letters Patent No. 2,972,600 describes the preparation of resins of this type by brominating phenol formaldehyde resins formed from 2-hydroxymethyl 4-alkyl phenols, 2,6-dihydroxymethyl 4-alkyl phenols, and resitols comprising an average of up to 4 phenol units based thereon. Such resins also are described in United States Letters Patent No. 3,165,496 and their use in vulcanizing butyl rubbers and butyl rubber combinations is disclosed in United States Letters Patent Nos. 3,039,978 and 3,093,613. It should be noted that, in the latter two patents, the bromo-methyl alkylated phenol formaldehyde resin is used to fully vulcanize different butyl rubber combinations over long periods of time, i.e., 20 to 60 minutes at a temperature of 307° F., or above. By way of contrast, the pressure-sensitive adhesive compositions of this invention are cured in situ on the tape or sheet backings very rapidly, i.e., in a fraction of a minute at about 350° F., and normally less than a minute at temperatures as low as 250° F. In fact, many of the adhesives of this invention can be cured in about 5 seconds at 350° F. to an optimum performance level.

Various aldehyde-resin-reactive diene polymers may be used as the elastomeric constituent in the adhesive composition of this invention. For instance, conjugated diene polymers based on butadiene, isoprene, and the like; copolymers of these materials with one another; and copolymers of one or more of such materials with one or more other monomers, such as acrylonitrile, styrene, or the like may be used.

Various liquid or solid tackifiers compatible with the diene elastomer may be used. These include Staybelite Ester #10, a glycerol ester of hydrogenated rosin sold by Hercules, Inc.; Piccolyte S-115, a terpene resin based upon beta pinene and sold by the Harwick Standard Chemical Co., and having a melting point of about 115° F. by the ball and ring method; TPO #1, a combination of about 70-77 percent petroleum hydrocarbon resin with the remainder a completely saturated napthenic oil and wherein the petroleum hydrocarbon portion consists of styrene, ring substituted styrenes and indene, as well as a small percentage of isoprene, offered commercially by Velsicol Chemical Corporation, said resin having a viscosity of 408,000 centipoises; and many others.

The invention will be further illustrated by the following examples. It should be understood that although these examples may describe specific features of the invention, they are given only for the purpose of illustration and the invention should not be construed as limited thereto.

EXAMPLES I-III

A series of three adhesive compositions according to this invention are formulated as indicated in Table A.

Examples I and II illustrate adhesive compositions of this invention wherein the amount of curing resin and curing temperature both are varied, whereas Example III illustrates a control composition having a formulation the same as that of Example II, except that it includes no zinc resinate accelerator. The adhesive compositions of Examples I-III are coated by a conventional coating technique upon one side of an impregnated paper backing sheet which previously was coated on the other side with a release coating composition. The backing is prepared from a 28½ lb. creped kraft paper which is impregnated to increase its internal strength, as described in United States Letters Patent No. 2,848,105 to Bartell et al. The release coating composition is formulated and applied as described in United States Letters Pat. No. 2,913,355 to Collins. Both the impregnant and release coating are dried and cured prior to application of the adhesive. The adhesive composition is applied to the backing by reverse roller coating at a coated weight of approximately 1.8 oz./sq. yd.

In each Example, the coated backing is dried quickly at a temperature of approximately 180° F. to remove a substantial portion of the toluene therefrom. Then, the sheet is passed through a curing oven and exposed to the curing temperatures indicated in Table A for the times shown. Table A also indicates proportions of all constituents of the adhesive compositions in parts per one hundred parts by weight of the elastomer, as well as percent solids in toluene and the values obtained for adhesion to steel and quick stick when the resulting tapes are slit and tested in the below described manner.

TABLE A

| | I | II | III |
| --- | --- | --- | --- |
| Pale crepe rubber elastomer | 100 | 100 | 100 |
| Piccolyte S-115 tackifier | 65 | 65 | 65 |
| Schenectady 1056 curing resin | 10 | 15 | 15 |
| Zinc resinate accelertor | 10 | 10 | |
| Santovar A antioxidant | 1 | 1 | 1 |
| Ionol antioxidant | 1 | | |
| Zinc dibutyl dithiocarbamate | 1 | 2 | 2 |
| Percent solids in toluene | 30 | 30 | 30 |
| Adhesion to steel, ozs | 47 | 38 | 32 |
| Quick Stick | 2.6 | 2.4 | 5 |
| Curing temperature, ° F | 300 | 270 | 325 |
| Cure level | (¹) | (¹) | (²) |
| Curing time, seconds | 30 | 45 | 300 |

¹ Moderate.
² No cure.

The resulting adhesive sheets are slit into tapes one inch wide which, in turn, are wound upon themselves on cores to form rolls of pressure-sensitive adhesive tape in accordance with this invention. The tapes of Examples I and II exhibit eminently satisfactory cured adhesive charartersitics. The tape of Example III is unsuitable for use where high shear loads are involved or where exposure to elevated temperatures is a performance requirement.

The adhesive strength or adhesion to steel is measured by peeling the tape backing over itself 180° at a constant speed (by a force applied to the free end of the tape) from a smooth steel surface to which it has been applied by a fixed pressure. For the techniques used in conducting this test, see the 180° peel adhesion test PSTC-I of the Pressure Sensitive Tape Council.

Quick stick is measured by laying a length of tape, adhesive side up, upon a horizontal surface and then rolling a hollow plastic ball down an incline onto the adhesive. The vertical height at which the ball starts and the distance the ball rolls along the tape before coming to rest is measured. Quick stick is reported as the height in inches raised to the three-halves power, divided by the distance rolled in inches. This ratio is found to be a constant for a given tape. The ball used is plastic, approximately 1.5 inches in diameter, and weighs approximately 2 grams. Its outer surface is carefully cleaned between each test.

The cure level of the tapes was judged by solvent solubility, or degree of swelling in toluene.

The tapes of Examples I and II also possess excellent high temperature stability and holding properties and may be removed from surfaces to which they have been attached after having been exposed to a temperature of 300° F. for at least 4 hours, without ghosting or leaving any traces of adhesive upon the application surface. This high temperature hold test simultaneously demonstrates the cohesive or internal strength of the adhesive layer of the tape, as well as its ability to hold to a smooth surface at high temperatures, and the fact that the tapes do not ghost when removed from the surface after being subjected to the most severe conditions.

The apes of Examples I and II both cure to the moderate level normally desired for most pressure-sensitive adhesive applications in a fraction of a minute. The tape of Example III, on the other hand, does not even cure in 5 minutes when exposed to the more drastic temperature of 325° F., thus indicating that the zinc resinate addition exerts an almost instantaneous and dramatic accelerating effect on the curing rate.

EXAMPLES IV-VIII

A series of five adhesive compositions are formulated as indicated in Table B, below, made into tapes according to this invention and tested for adhesion to steel, quick stick and high temperature properties, as described in connection with Examples I-III with the results indicated in the table.

It will be seen that the adhesive compositions of Examples IV-VIII are identical except that they contain amounts of zinc resinate varying from 5 to 25 parts. These adhesive compositions are coated at a weight of 1 oz./sq. yd. on a Mylar film approximately 2 mils thick and cured at 350° F., as indicated.

TABLE B

| | IV | V | VI | VII | VIII |
| --- | --- | --- | --- | --- | --- |
| SBR 4502 elastomer | 100 | 100 | 100 | 100 | 100 |
| TPO #1 tackifier | 150 | 150 | 150 | 150 | 150 |
| Schenectady 1056 curing resin | 25 | 25 | 25 | 25 | 25 |
| Zinc resinate | 5 | 10 | 15 | 20 | 25 |
| Ionol antioxidant | 1 | 1 | 1 | 1 | 1 |
| Zinc dibutyl dithiocarbamate | 1 | 1 | 1 | 1 | 1 |
| Percent solids in toluene | 50 | 50 | 50 | 50 | 50 |
| Adhesion to steel (oz.) | 103 | 110 | 115 | 110 | 107 |
| Quick Stick | 4 | 4 | 4 | 4 | 2 |
| Curing temperature, ° F | 350 | 350 | 350 | 350 | 350 |

The tape of Example VI wherein 15 parts of zinc resinate are used cures most rapidly. For instance, it reaches the moderate level of cure desirable for most adhesive tape applications in a small fraction of a minute. In general, the tapes of Examples V, VI and VII cure more rapidly than those of Examples IV and VIII, but all of these tapes reach a tight cure in slightly over one-half a minute.

The SBR 4502 elastomer referred to in the foregoing examples is a copolymer of approximately 75 percent butadiene and 25 percent styrene and is glue-acid coagulated. The Schenectady 1056 curing resin possesses a specific gravity of about 1.05 and a melting point of 135° F. by the capillary method. This resin has a bromine content of about 6 percent or over and a methylol content of about 10 to 12½ percent, both by weight of the resin. Santovar A is a ditertiary amyl hydroquinone and Ionol is a ditertairy butyl para cresol.

Having now described the invention in specific detail and exemplified the manner in which it may be carried into practice, it will be readily apparent to those skilled in the art that innumerable variations, modifications, applications and extensions of the basic principles involved may be made without departing from its spirit or scope.

What is claimed is:

1. A normally tacky and heat cured pressure-sensitive adhesive sheet which comprises a flexible backing coated on at least one major surface thereof with a pressure-sensitive adhesive composition comprising about 100 parts of an aldehyde-resin-reactive diene elastomer, about 25–500 parts of a tackifier compatible with said elastomer, about 5–40 parts of an oil soluble heat and elastomer-reactive bromo-methyl alkylated phenol formaldehyde curing resin, containing about 1–9 percent of bromine, and about 5–25 parts of zinc resinate as the accelerator for curing said adhesive composition.

2. A pressure-sensitive adhesive sheet according to claim 1, wherein said curing resin is a para alkyl phenol formaldehyde resin bromo-methylated in one or both of the ortho positions.

3. A pressure-sensitive adhesive sheet according to claim 2, wherein the para alkyl group contains about 4–20 carbon atoms.

4. A pressure-sensitive adhesive sheet according to claim 3, wherein said alkyl group contains eight or nine carbon atoms.

5. A pressure-sensitive adhesive sheet according to claim 1, wherein the zinc resinate is present in the adhesive composition in the amount of about 10–20 parts.

6. A pressure-sensitive adhesive sheet according to claim 1, wherein said curing resin is produced by brominating phenol formaldehyde resins formed from 2-hydroxymethyl 4-alkyl phenols, 2,6-dihydroxymethyl 4-alkyl phenols, and resitols comprising an average of up to 4 phenol units based thereon.

References Cited

UNITED STATES PATENTS

| | | | |
|---|---|---|---|
| 2,708,192 | 5/1955 | Joesting | 117—122 |
| 2,972,600 | 2/1961 | Braidwood | 260—59 |
| 2,987,420 | 6/1961 | Bemmels et al. | 117—122 |
| 2,999,769 | 9/1961 | Korpman | 117—122 |
| 3,165,496 | 1/1965 | Fusco et al. | 260—59 |

WILLIAM D. MARTIN, Primary Examiner

T. G. DAVIS, Assistant Examiner

U.S. Cl. X.R.

117—68.5, 161